United States Patent
Kobayashi et al.

(10) Patent No.: US 7,605,102 B2
(45) Date of Patent: Oct. 20, 2009

(54) ALUMINUM NITRIDE CERAMIC AND SEMICONDUCTOR MANUFACTURING MEMBER

(75) Inventors: Yoshimasa Kobayashi, Nagoya (JP); Naohito Yamada, Kasugai (JP); Toru Hayase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/677,171

(22) Filed: Feb. 21, 2007

(65) Prior Publication Data

US 2007/0135293 A1  Jun. 14, 2007

Related U.S. Application Data

(62) Division of application No. 11/153,921, filed on Jun. 15, 2005, now Pat. No. 7,211,216.

(60) Provisional application No. 60/580,894, filed on Jun. 18, 2004.

(51) Int. Cl.
*C04B 35/581* (2006.01)

(52) U.S. Cl. .................. 501/98.4; 501/98.5; 428/398; 428/702; 428/703

(58) Field of Classification Search ............... 501/98.4, 501/98.5, 98.6; 428/398, 702, 703
See application file for complete search history.

(56) References Cited

U.S. PATENT DOCUMENTS 6,403,510 B1  6/2002  Kuibira et al.

FOREIGN PATENT DOCUMENTS

| JP | 02009766 | 12/1990 |
|---|---|---|
| JP | 08-109069 A | 4/1996 |
| JP | H10-045461 | 2/1998 |
| JP | H11-209182 | 8/1999 |
| JP | 2001-240474 | 9/2001 |
| JP | 2002-097075 | 4/2002 |
| JP | 2003-335589 | 11/2003 |

OTHER PUBLICATIONS

Translation of JP 02009766, Dec. 1990.*

* cited by examiner

*Primary Examiner*—Karl E Group
(74) *Attorney, Agent, or Firm*—Burr & Brown

(57) ABSTRACT

An aluminum nitride ceramic including aluminum nitride grains and grain boundary phases comprises a grain boundary phase-rich layer including more amount of the grain boundary phases in a surface layer of the aluminum nitride ceramic than in an inside of the aluminum nitride ceramic. The grain boundary phases in the grain boundary phase-rich layer include at least one of rare earth element and alkali earth element.

8 Claims, 12 Drawing Sheets

AlN-Al$_2$O$_3$-Y$_2$O$_3$-MgO (1800°C)

AlN-Al$_2$O$_3$-CeO$_2$-MgO (1800°C)

AlN-Al$_2$O$_3$-Y$_2$O$_3$ (1825°C)

AlN-Al$_2$O$_3$-CeO$_2$ (1825°C)

AlN-Al$_2$O$_3$-Sm$_2$O$_3$ (1825°C)

AlN-Al$_2$O$_3$-Sm$_2$O$_3$-MgO(1800°C)

AlN-Y$_2$O$_3$

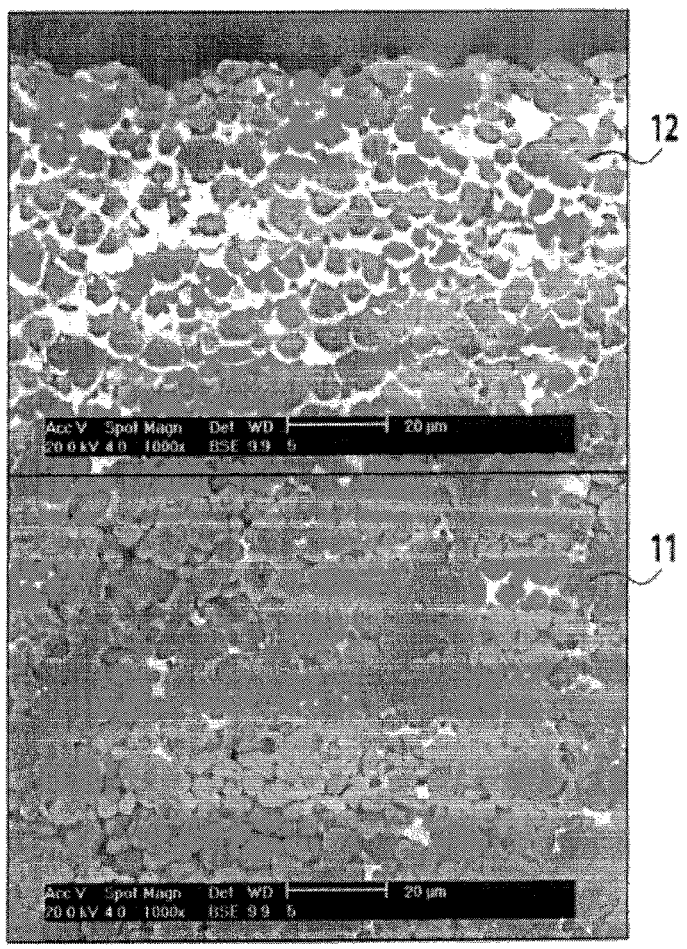
FIG.11A SURFACE LAYER
FIG.11B INSIDE
AlN-Al$_2$O$_3$+Sm$_2$O$_3$ (1825°C)

FIG.12A
SURFACE LAYER
FIG.12B
FIG.12C
INSIDE
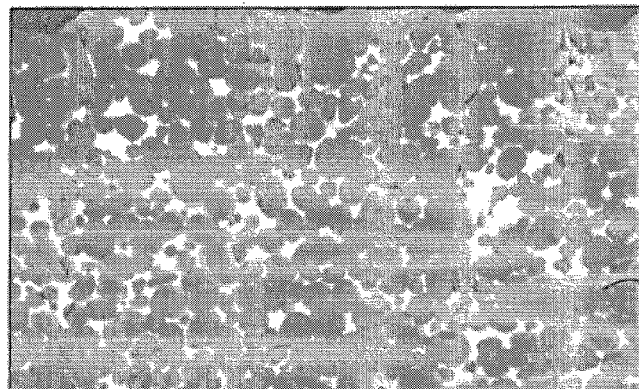
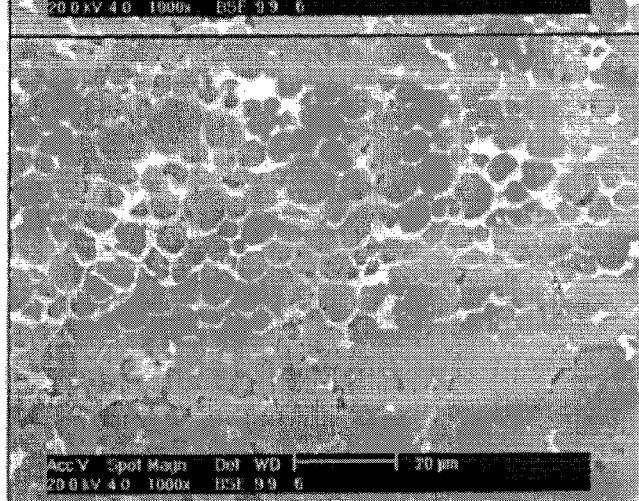
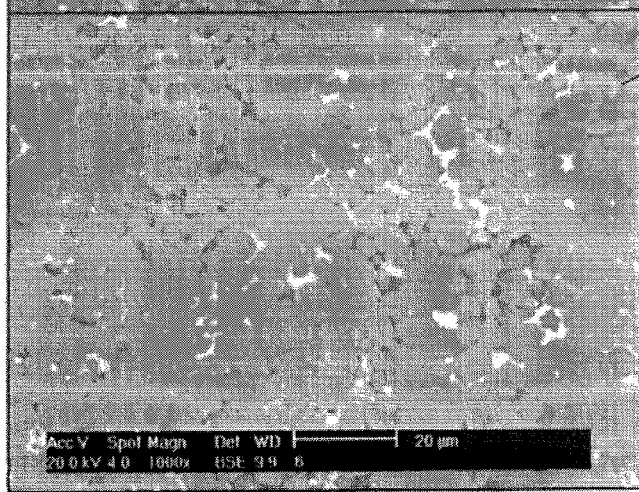
AlN-Al$_2$O$_3$-Sm$_2$O$_3$-MgO(1800°C)

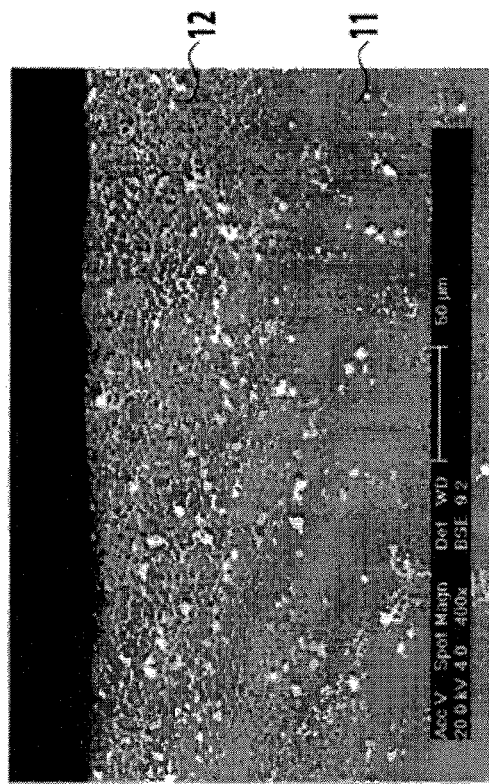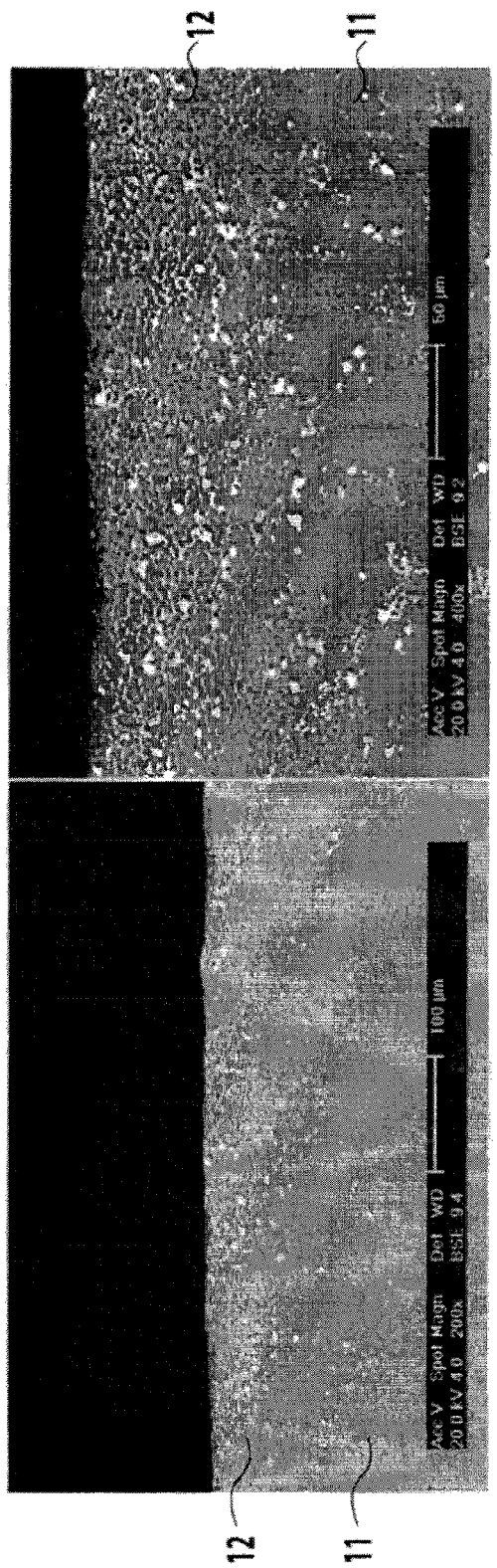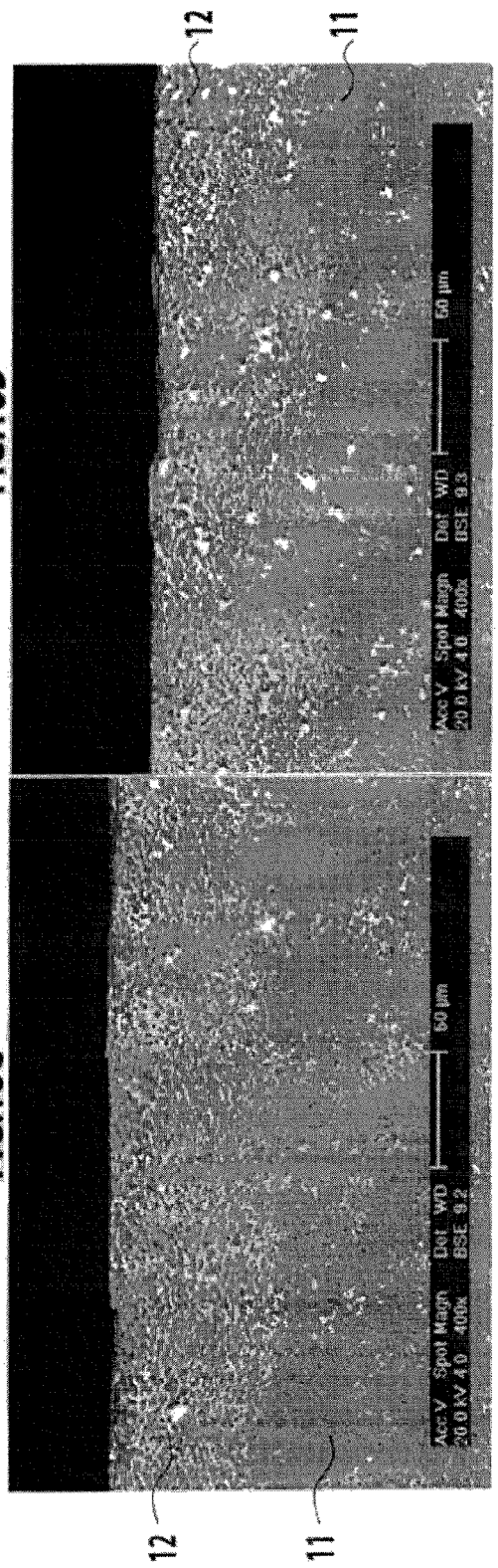
FIG.18A FIG.18B FIG.18C FIG.18D

ALUMINUM NITRIDE CERAMIC AND SEMICONDUCTOR MANUFACTURING MEMBER

CROSS REFERENCE TO RELATED APPLICATIONS

This application is a division of U.S. application Ser. No. 11/153,921, filed Jun. 15, 2005, and also claims the benefit of U.S. Provisional Application Ser. No. 60/580,894, filed on Jun. 18, 2004, the entireties of which are incorporated herein by reference.

BACKGROUND OF THE INVENTION

1. Field of the Invention

The present invention relates to an aluminum nitride ceramic, a semiconductor manufacturing member, and a manufacturing method for the aluminum nitride ceramic.

2. Description of the Related Art

Conventionally, an aluminum nitride sintered body is used as a semiconductor manufacturing member since it has high corrosion resistance, thermal conductance, and electrical characteristics (e.g., Japanese Patent Application Laid-open 2002-97075). In addition, a method of coating a high corrosion resistant material for corrosion resistance improvement has been proposed (e.g., Japanese Patent Application Laid-open 2003-335589).

However, in the context of a semiconductor manufacturing process environment, even an aluminum nitride sintered body may not have insufficient corrosion resistance. Furthermore, in the case of coating, there is concern for impairment of high thermal conductance and electrical characteristics of aluminum nitride if the surface of the aluminum nitride sintered body is entirely covered with a coating material. Moreover, the coating material may peel off and become a source for particles during use.

SUMMARY OF THE INVENTION

An object of the present invention is to improve corrosion resistance of an aluminum nitride ceramic while maintaining aluminum nitride characteristics.

An aluminum nitride ceramic according to an embodiment of the present invention includes aluminum nitride grains and grain boundary phases. Furthermore, the aluminum nitride ceramic comprises a grain boundary phase-rich layer including more grain boundary phases in a surface layer of the aluminum nitride ceramic than in an inside of the aluminum nitride ceramic. In addition, the grain boundary phases in the grain boundary phase-rich layer include at least one of rare earth element and alkali earth element.

The grain boundary phases in the grain boundary phase-rich layer have high corrosion resistance since they include at least one of rare earth element and alkali earth element. The aluminum nitride ceramic may have high corrosion resistance since it comprises the grain boundary phase-rich layer including much amount of grain boundary phases, which have high corrosion resistant in the surface layer. Furthermore, since the grain boundary phase-rich layer is formed only in the surface layer, aluminum nitride characteristics are not impaired. Accordingly, the aluminum nitride ceramic may have higher corrosion resistance while maintaining aluminum nitride characteristics.

A semiconductor manufacturing member according to an embodiment of the present invention is at least partly formed with an aluminum nitride ceramic including aluminum nitride grains and grain boundary phases. In addition, the aluminum nitride ceramic comprises a grain boundary phase-rich layer including more amount of grain boundary phases in a surface layer of the aluminum nitride ceramic than in an inside of the aluminum nitride ceramic. Furthermore, the grain boundary phases in the grain boundary phase-rich layer include at least one of rare earth element and alkali earth element. This can provide a semiconductor manufacturing member having high corrosion resistance and aluminum nitride characteristics.

A manufacturing method for an aluminum nitride ceramic according to an embodiment of the present invention comprises forming an aluminum nitride sintered body, and forming a grain boundary phase-rich layer including more amount of grain boundary phases in a surface layer of the aluminum nitride sintered body than in an inside of the aluminum nitride sintered body, in which the grain boundary phases include at least one of rare earth element and alkali earth element by impregnating the surface layer of the aluminum nitride sintered body with an impregnant which is melted and includes at least one of the rare earth element and the alkali earth element.

A manufacturing method for an aluminum nitride ceramic according to an embodiment of the present invention comprises forming an aluminum nitride sintered body including grain boundary phases, which includes at least one of rare earth element and alkali earth element, and at least two components differing in reducing characteristics, forming a grain boundary phase-rich layer including more amount of the grain boundary phases between an inside and a surface layer of the aluminum nitride sintered body than in the inside by heat treatment at a temperature, which the grain boundary phases can exist in a solid phase before heat treatment and become a liquid phase by reducing at least one of components and changing composition of the grain boundary phases in a reduction atmosphere, and removing the surface layer covering the grain boundary phase-rich layer.

According to these manufacturing methods, aluminum nitride ceramic comprising a grain boundary phase-rich layer including more amount of grain boundary phases in the surface layer of the aluminum nitride ceramic than in the inside can be manufactured. Furthermore, in the aluminum nitride ceramic, the grain boundary phases of the grain boundary phase-rich layer include at least one of rare earth element and alkali earth element. Therefore, this allow to improve corrosion resistance of the aluminum nitride ceramic while maintaining aluminum nitride characteristics

BRIEF DESCRIPTION OF THE DRAWINGS

FIGS. 11A and 11B are SEM micrographs of cross sections of the aluminum nitride ceramic of working example 5;

FIGS. 12A through 12C are SEM micrographs of cross sections of the aluminum nitride ceramic of working example 6;

FIGS. 18A through 18D are SEM micrographs of cross sections of aluminum nitride ceramic of working example 17.

DETAILED DESCRIPTION OF THE INVENTION (Aluminum Nitride Ceramic)

Figure 1:
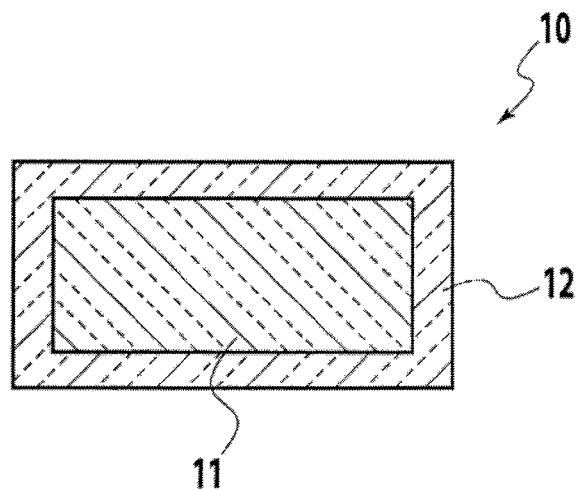
FIG. 1 is a diagram showing aluminum nitride ceramic.

The aluminum nitride ceramic includes aluminum nitride (AlN) grains and grain boundary phases. In addition as shown in FIG. 1, aluminum nitride ceramic 10 includes a grain boundary phase-rich layer 12 including more amount of grain boundary phases in a surface layer of the aluminum nitride ceramic 10 than in an inside 11 thereof. In other words, grain boundary phase content of the grain boundary phase-rich layer 12 formed in the surface layer of the aluminum nitride ceramic 10 is greater than that in the inside 11. Furthermore, the grain boundary phases in the grain boundary phase-rich layer 12 include at least one of a rare earth element and an alkali earth element.

The grain boundary phases in the grain boundary phase-rich layer 12 have high corrosion resistance since they include at least one of rare earth element and alkali earth element. The aluminum nitride ceramic 10 may have high corrosion resistance since it comprises the grain boundary phase-rich layer 12 including much amount of grain boundary phases, which have high corrosion resistant in the surface layer that is exposed to a corrosive environment. Futhermore, since the grain boundary phase-rich layer 12 is formed only in the surface layer, aluminum nitride characteristics are not impaired. Accordingly, the aluminum nitride ceramic 10 may have higher corrosion resistance while maintaining its characteristics. For example, the aluminum nitride ceramic 10 can maintain electrical characteristics such as volume resistivity and high thermal conductance. Furthermore, particles are not generated as when using a coating material.

In the grain boundary phase-rich layer 12, the aluminum nitride grains are preferably covered by the grain boundary phases. This improves corrosion resistance of the aluminum nitride ceramic 10. A thickness of the grain boundary phases covering the aluminum nitride grains is preferably about 0.05 to about 5 μm. The thickness of the grain boundary phases of about 0.05 μm or more improves corrosion resistance of the aluminum nitride ceramic 10. Furthermore, the thickness of the grain boundary phases of about 5 μm or less prevents decrease in thermal conductance of the grain boundary phase-rich layer 12. Therefore, the aluminum nitride ceramic 10 may have higher corrosion resistance and high thermal conductance.

The grain boundary phase content in the grain boundary phase-rich layer 12 may be relatively more than that in the inside 11. However, it is preferable that the grain boundary phase content in the grain boundary phase-rich layer 12 is about 10 to about 70% by volume. The grain boundary phase content may be found by calculating {grain boundary phase amount/(aluminum nitride amount+grain boundary phase amount)}×100(volume %). A grain boundary phase content of about 10% by volume or more improves corrosion resistance of the aluminum nitride ceramic 10. Furthermore, a grain boundary phase content of about 70% by volume or less prevents significant decrease in thermal conductance of the grain boundary phase-rich layer 12. Therefore, the aluminum nitride ceramic 10 may have higher corrosion resistance and high thermal conductance. It is further preferable that the grain boundary phase content in the grain boundary phase-rich layer 12 is about 10 to about 50% by volume.

A thickness of the grain boundary phase rich layer 12 is preferably about 1 to about 200 μm. In other words, the grain boundary phase-rich layer 12 is preferably formed within a range from the surface of the aluminum nitride ceramic 10 to about 1 to 200 μm away therefrom. The thickness of the grain boundary phase-rich layer 12 of about 1 μm or more improves corrosion resistance of the aluminum nitride ceramic 10. Furthermore, the thickness of the grain boundary phase-rich layer 12 of about 200 μm or less prevents decrease in thermal conductance of the aluminum nitride ceramic 10. The thickness of the grain boundary phase-rich layer 12 is further preferably about 5 to about 100 μm.

The inside 11 of the aluminum nitride ceramic 10 has less amount of grain boundary phases than the grain boundary phase-rich layer 12. In other words, the grain boundary phase content of the inside 11 of the aluminum nitride ceramic 10 is less than that of the grain boundary phase-rich layer 12.

The content of grain boundary phases preferably decrease at a slant from the grain boundary phase-rich layer 12, which is in the surface layer of the aluminum nitride ceramic 10, toward the inside 11. In other words, in the aluminum nitride ceramic 10, the composition preferably slants from the surface layer inward. This prevents drastic changes in coefficient of thermal expansion between the grain boundary phase-rich layer 12 and the inside 11. In other words, the difference in coefficient of thermal expansion between the grain boundary phase-rich layer 12 and the inside 11 can be offset therebetween. As a result, deformation and cracking of the grain boundary phase-rich layer 12 due to the difference in coefficient of thermal expansion can be prevented. The content of grain boundary phases may decrease from the grain boundary phase-rich layer 12 toward the inside 11 continuously or stepwise.

It is preferable that the grain boundary phase content of the inside 11 is about 0 to about 20% by volume. This allows the inside 11 of the aluminum nitride ceramic 10 to have high thermal conductance. Therefore, even if the thermal conductance of the grain boundary phase-rich layer 12 is somewhat low, the inside 11 can compensate for it. As a result, the aluminum nitride ceramic 10 as a whole can have a high thermal conductance. It is further preferable that the grain boundary phase content in the inside 11 is about 0 to about 9% by volume.

The grain boundary phases in the grain boundary phase-rich layer 12 preferably include at least one of yttrium (Y), cerium (Ce), samarium (Sm), europium (Eu), lanthanum (La), praseodymium (Pr), neodymium (Nd), promethium (Pm), gadolinium (Gd), terbium (Tb), and dysprosium (Dy) as at least one of rare earth element and alkali earth element. Grain boundary phase components including these elements can have high wettability with the aluminum nitride grains. Therefore, the grain boundary phases can cover the aluminum nitride grains, and this can improve corrosion resistance. The grain boundary phases in the grain boundary phase-rich layer 12 preferably include at least one of yttrium, cerium, and samarium. The grain boundary phases can keep the volume resistivity of the aluminum nitride ceramic 10 at room temperature between about $10^8$ to about $10^{15}$ $\Omega \cdot cm$ when including cerium or samarium.

Furthermore, the grain boundary phases in the grain boundary phase-rich layer 12 preferably include at least one of aluminum (Al), magnesium (Mg), calcium (Ca), strontium (Sr), and barium (Ba). The grain boundary phase components including these elements can lower the melting point thereof. Hereafter, these elements are referred to as 'melting point lowering elements'. This prevents addition of unnecessary heat to the aluminum nitride sintered body when forming the grain boundary phase-rich layer 12. As a result, this can prevent adverse affects on aluminum nitride characteristics, deformation and the like. Furthermore, grain boundary phase components including magnesium have high wettability with the aluminum nitride grains. Therefore, the grain boundary phases can cover the aluminum nitride grains, and this can improve corrosion resistance thereof.

Furthermore, it is preferable that the grain boundary phase components in the grain boundary phase-rich layer 12 are ternary. This improves wettability of the grain boundary phase components with the aluminum nitride grains. Therefore, the grain boundary phases can cover the aluminum nitride grains, and this can improve corrosion resistance thereof.

At least one of rare earth element and alkali earth element included in the grain boundary phases of the grain boundary phase-rich layer 12 exists as, for example, a compound such as oxides, oxynitrides or the like. For example, the grain boundary phases in the grain boundary phase-rich layer 12 may include a complex oxide or a complex oxynitride of at least one of rare earth element and alkali earth element, and aluminum supplied from aluminum nitride. In addition, when the grain boundary phases include melting point lowering elements, the melting point lowering elements also exist as a compound such as complex oxides, complex oxynitrides or the like. Therefore, in the case of the grain boundary phases of the grain boundary phase-rich layer 12 including melting point lowering elements or including multiple rare earth elements or alkali earth elements, the grain boundary phases in the grain boundary phase-rich layer 12 may include complex oxides or complex oxynitrides, or multiple oxides or nitrides thereof.

Yttrium oxide ($Y_2O_3$), cerium oxide ($CeO_2$), samarium oxide ($Sm_2O_3$) and the like, for example, are available as unitary grain boundary phase components. A combination of aluminum oxide and yttrium oxide, a combination of aluminum oxide and cerium oxide, a combination of aluminum oxide and samarium oxide, respective combinatorial complex oxides and the like, for example, are available as binary grain boundary phase components. A combination of aluminum oxide, yttrium oxide and magnesium oxide, a combination of aluminum oxide, cerium oxide and magnesium oxide, a combination of aluminum oxide, samarium oxide and magnesium oxide, respective combinatorial complex oxides and the like, for example, are available as ternary grain boundary phase components.

The grain boundary phases in the grain boundary phase-rich layer 12 may further include other elements or compounds. For example, the grain boundary phases may include silicon (Si). The grain boundary phase components including silicon can lower the melting point thereof.

Such aluminum nitride ceramic 10 is applicable to various applications requiring corrosion resistance. In other words, the aluminum nitride ceramic 10 may be used as a corrosion resistant member. For example, the semiconductor manufacturing members may be at least partly formed with the aluminum nitride ceramic 10. This can provide a semiconductor manufacturing member having high corrosion resistance and aluminum nitride characteristics such as high thermal conductance and electrical characteristics.

More specifically, even when the aluminum nitride ceramic 10 is used in the semiconductor manufacturing process using a corrosive gas such as fluorinated gas at a high temperature, aluminum fluoride ($AlF_3$) does not generate and evaporate. In other words, the aluminum nitride ceramic 10 has sufficient corrosion resistance against even such a high corrosive environment, and may be available in such an environment.

At least a part of the semiconductor manufacturing members such as an electrostatic chuck, a heater, a radio frequency (RF) susceptor and a ring, for example, may be formed with the aluminum nitride ceramic 10. These are used in the semiconductor manufacturing process, inspection process, or the like. More specifically, portions exposed to the corrosive environment are preferably formed with the grain boundary phase-rich layer 12. For example, a dielectric layer of an electrostatic chuck may be formed with the grain boundary phase-rich layer 12.

(Manufacturing method)

Such aluminum nitride ceramic 10 may be manufactured by forming an aluminum nitride sintered body and then forming a grain boundary phase-rich layer 12 by impregnating the surface layer of the aluminum nitride sintered body with an impregnant, which is melted and includes at least one of the rare earth element and the alkali earth element. The grain boundary phase-rich layer 12 includes a greater amount of grain boundary phases in the surface layer of the aluminum nitride sintered body than the inside of the aluminum nitride sintered body. Furthermore, the grain boundary phases in the grain boundary phase-rich layer 12 include at least one of rare earth element and alkali earth element.

The impregnant preferably includes at least one of yttrium, cerium, samarium, europium, lanthanum, praseodymium, neodymium, promethium, gadolinium, terbium, and dysprosium as at least one rare earth element or alkali earth element. The impregnant including these elements has high wettability with aluminum nitride grains. Therefore, the grain boundary phases can be formed to cover the aluminum nitride grains, and this can improve corrosion resistance. The impregnant preferably includes at least one of yttrium, cerium, and samarium.

Furthermore, the impregnant preferably includes at least one of aluminum, magnesium, calcium, strontium, and barium, namely a melting point lowering element. The impregnant including these elements lowers the melting point thereof. This prevents addition of unnecessary heat to the aluminum nitride sintered body when forming the grain boundary phase-rich layer 12. Therefore, this can prevent adverse affects on aluminum nitride characteristics, deformation and the like. In addition, this facilitates the impregnation operation. Furthermore, magnesium improves wettability of the impregnant with the aluminum nitride grains. Therefore, the grain boundary phases can be formed to cover the aluminum nitride grains, this can improve corrosion resistance thereof. Note that aluminum may be omitted from the impregnant since aluminum oxide obtained by oxidizing aluminum nitride grain surfaces may be used as a resource for aluminum. In other words, the resource for aluminum is not limited.

Furthermore, it is preferable that the impregnant is ternary. This improves wettability of the impregnant with the aluminum nitride grains. Therefore, the grain boundary phases can cover the aluminum nitride grains, this can improve corrosion resistance thereof.

The impregnant may be, for example, a compound such as oxides or the like including at least one of rare earth element and alkali earth element. Therefore, in the case of the impregnant including melting point lowering elements or including multiple rare earth elements or alkali earth elements, the impregnant may be complex oxides thereof or a mixture of multiple oxides.

Yttrium oxide, cerium oxide, samarium oxide and the like, for example, are available as unitary impregnants. A combination of aluminum oxide and yttrium oxide, a combination of aluminum oxide and cerium oxide, a combination of aluminum oxide and samarium oxide, respective combinatorial complex oxides and the like, for example, are available as binary impregnants. A combination of aluminum oxide, yttrium oxide and magnesium oxide, a combination of aluminum oxide, cerium oxide and magnesium oxide, a combination of aluminum oxide, samarium oxide and magnesium oxide, respective combinatorial complex oxides and the like, for example, are available as ternary impregnants.

The form of the impregnant is not limited. For example, a bulk, powder, solution or the like including the above-given impregnant components may be used. The solution may be in slurry form or sol form, for example.

In the case of using a bulk impregnant, placing the bulk impregnant on the aluminum nitride sintered body brings the aluminum nitride sintered body surface and the impregnant into contact. In the case of using a powder impregnant, placing the powder impregnant on the aluminum nitride sintered body and burying the aluminum nitride sintered body in the powder impregnant brings the aluminum nitride sintered body surface and the impregnant into contact. In the case of using a impregnant solution, immersing (dipping) the aluminum nitride sintered body in the impregnant solution and then pulling it out of the impregnant solution, or applying the impregnant solution on the aluminum nitride sintered body brings the aluminum nitride sintered body surface and the impregnant into contact.

The impregnant is then melted while the aluminum nitride sintered body surface and the impregnant are in contact, impregnating the surface layer of the aluminum nitride sintered body with the melted impregnant. More specifically, the impregnant is soaked into the aluminum nitride sintered body along the grain boundaries.

The impregnation temperature for melting the impregnant and carrying out impregnation may be determined according to the impregnant type. Typically, the impregnant and aluminum nitride and the like included in the aluminum nitride sintered body react. As a result, a reactant is generated. Therefore, the impregnation temperature may be set to the melting point of the reactant of the impregnant and aluminum nitride and the like or more. Alternatively, the impregnation temperature may be set to the melting point of the impregnant or more. Generally, the impregnation temperature is preferably set between about 1600 and about 2000° C. The impregnation temperature is more preferably set between about 1700 and about 1850° C. This prevents addition of unnecessary heat to the aluminum nitride sintered body. Therefore, this can prevent adverse affects on aluminum nitride characteristics, deformation or the like by carrying out impregnation at a lower temperature.

Typically, impregnation is preferably carried out for about 10 minutes to about 10 hours. In other words, holding at the impregnation temperature for about 10 minutes to about 10 hours is preferred. Carrying out impregnation for about 10 minutes or more allows sufficient permeation of the melted impregnant into the aluminum nitride sintered body, and forming a sufficient grain boundary phase-rich layer 12. Furthermore, addition of unnecessary heat to the aluminum nitride sintered body can be prevented by keeping impregnation time (holding time) to under about 10 hours. As a result, adverse affects on aluminum nitride characteristics, deformation or the like can be prevented. In addition, the atmosphere for impregnation is not limited, and may be carried out in nitrogen atmosphere, for example.

Through such impregnation, the impregnant permeates inward from the surface of the aluminum nitride sintered body to which the impregnant has been in contact. The grain boundary phase-rich layer 12 is then formed in the surface layer of the aluminum nitride sintered body. Furthermore, the aluminum nitride ceramic 10, which has grain boundary phases decreasing at a slant toward the inside from the surface layer of the aluminum nitride sintered body, may be provided. Impregnating is carried out so that the aluminum nitride grains are covered by the grain boundary phases in the grain boundary phase-rich layer 12 preferably.

In this manner, the aluminum nitride ceramic 10 comprising the grain boundary phase-rich layer 12 including more amount of grain boundary phases in the surface layer than in the inside, in which the grain boundary phases include at least one of rare earth element and alkali earth element, can be manufactured. Therefore, corrosion resistance may be improved while maintaining aluminum nitride characteristics.

The thickness of the grain boundary phases in the grain boundary phase-rich layer 12, the grain boundary phase content of the grain boundary phase-rich layer 12, the thickness of the grain boundary phase-rich layer 12, and the grain boundary phase content of the inside 11 may be controlled by adjusting the impregnation temperature, impregnation time (holding time), and amount of the impregnant. Especially, the thickness of the grain boundary phase-rich layer 12 formed by impregnation can be determined according to the impregnation time (holding time).

The aluminum nitride sintered body used for impregnation preferably has a density of about 3.00 to about 3.60 g/cm$^3$. Furthermore, it is preferable that the aluminum nitride sintered body has a porosity of about 0 to about 10%. Furthermore, it is preferable that the aluminum nitride sintered body has a mean grain diameter of about 0.5 to about 20 μm. These allow the impregnant components to pervade the grain boundaries in the aluminum nitride sintered body, thereby properly forming the grain boundary phase-rich layer 12. In addition, the aluminum nitride sintered body used for impregnation may include an oxide or oxynitride including at least one of rare earth element and alkali earth element, a complex oxide including at least two of rare earth elements and alkali earth elements, or the like as grain boundary phases. However, it is preferable that the aluminum nitride sintered body includes at least about 91% by volume aluminum nitride. This improves thermal conductance of the aluminum nitride ceramic 10.

Such aluminum nitride sintered body may be formed in the following manner, for example. An aluminum nitride powder and a sintering aid are mixed to prepare a raw powder. The manufacturing method for the aluminum nitride powder is not limited, and may be formed through reductive nitriding, direct nitriding, vapor phase synthesis from alkylaluminum, or the like. Use of aluminum nitride powder obtained through reductive nitriding is preferred.

The sintering aid may be an oxide or the like including at least one of rare earth element and alkali earth element. For example, an yttrium oxide powder or the like may be used as the sintering aid. A commercially available yttrium oxide powder or an yttrium oxide powder formed by heating yttrium nitrate, yttrium sulfate, yttrium oxalate or the like may be used as the yttrium oxide powder. Furthermore, wet blending or dry blending may be carried out using a pot mill, a ball mill, or the like. In the case of wet blending, the raw powder is obtained by blending and then drying.

A compact is formed using the raw powder. The raw powder may be used as is, or a granulated powder formed from the raw powder may be used. The granulated powder may be formed by granulating slurry, which results from adding a solvent, binder or the like to the raw powder and blending, through spray granulation. The formation method is not limited, and various methods such as metal mold formation, cold isostatic pressing (CIP), slip casting, or the like.

The compact is then sintered, into an aluminum nitride sintered body. The sintering method is also not limited, and hot pressing, atmospheric sintering or the like may be used. The sintering atmosphere may be an inert gas atmosphere such as nitrogen gas, argon gas, and the like, or a reduction atmosphere such as hydrogen gas, carbon monoxide gas. The sintering temperature may be set between about 1600 and about 2000° C., for example.

Figure 2:
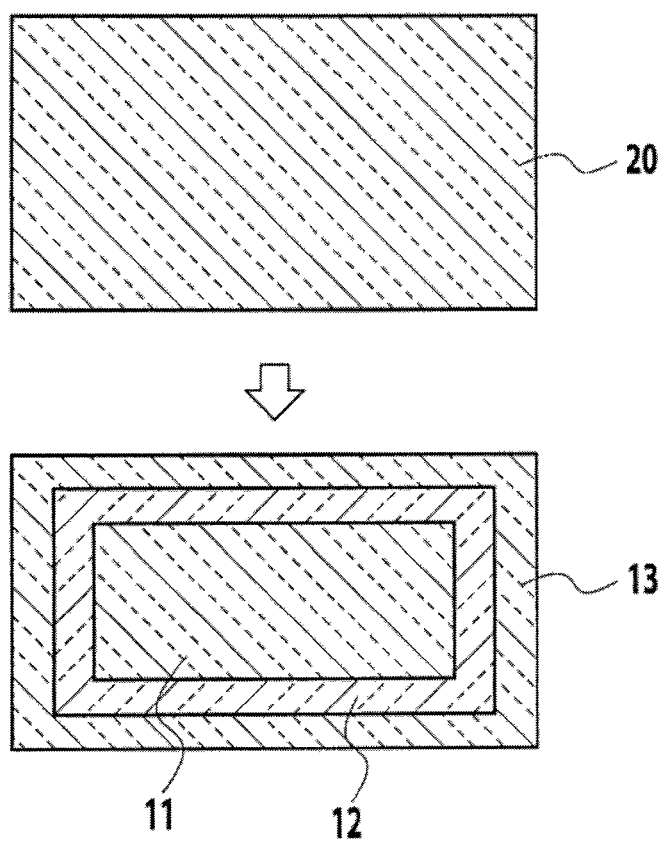
FIG. 2 is a diagram showing a manufacturing method for the aluminum nitride ceramic.

Furthermore, the aluminum nitride ceramic 10 may be manufactured by the manufacturing method shown in FIG. 2. First, the aluminum nitride sintered body 20 is formed including grain boundary phases, which includes at least one of rare earth element and alkali earth element, and at least two components differing in reducing characteristics. Next, the aluminum nitride sintered body 20 is heat treated at a temperature, which the grain boundary phases can exist in a solid phase before heat treatment and become a liquid phase by reducing at least one of components and changing composition of the grain boundary phases in a reduction atmosphere. According to this heat treatment, the grain boundary phase-rich layer 12 including more amount of grain boundary phases than in the inside 11 is formed between the inside 11 and a surface layer (hereafter referred as 'grain boundary phase-reduced layer 13') of the aluminum nitride sintered body 20. The grain boundary phase-reduced layer 13 in the surface layer covering the grain boundary phase-rich layer 12 is then removed. Respective processes are described in detail forthwith.

First, the aluminum nitride sintered body 20 is formed comprising grain boundary phases that satisfy two conditions. The first condition is that the grain boundary phases include at least one of rare earth element and alkali earth element to form a grain boundary phase-rich layer 12 including at least one of rare earth element and alkali earth element. The second condition is that the grain boundary phases include at least two components differing in reducing characteristics to change the composition of the grain boundary phases before heat treatment through heat treatment in a reduction atmosphere.

The grain boundary phases preferably include at least one of yttrium, cerium, samarium, europium, lanthanum, praseodymium, neodymium, promethium, gadolinium, terbium, and dysprosium as at least one of rare earth element and alkali earth element. Grain boundary phase components including these elements have high wettability with the aluminum nitride grains. Therefore, the grain boundary phases in the grain boundary phase-rich layer 12 can be formed to cover the aluminum nitride grains, and this can improve corrosion resistance. The grain boundary phases preferably include at least one of yttrium, cerium, and samarium.

Furthermore, the grain boundary phases preferably include at least one of aluminum, magnesium, calcium, strontium, and barium, namely a melting point lowering element. The grain boundary phase components including these elements lower the melting point thereof. This prevents addition of unnecessary heat to an aluminum nitride sintered body 20 when forming the grain boundary phase-rich layer 12. Therefore, adverse affects on aluminum nitride characteristics, deformation and the like can be prevented. Furthermore, magnesium improves wettability of the grain boundary phase components with the aluminum nitride grains. Therefore, the grain boundary phases in the grain boundary phase-rich layer 12 can be formed to cover the aluminum nitride grains, and this can improve corrosion resistance thereof.

Accordingly, for example, the grain boundary phases can satisfy the above first and second conditions by including a first component that includes at least one of rare earth element and alkali earth element, and a second component differing in reducing characteristics from the first component. If the second component differs in reducing characteristics from the first component, it may be a component including at least one of rare earth element and alkali earth element, or including a melting point lowering element. Furthermore, the first component and the second component in the grain boundary phases may exist as a mixture of independent compounds, or as a single complex compound.

For example, at least one of rare earth element and alkali earth element may exist as a compound such as oxides, oxynitrides or the like. For example, the grain boundary phases in the grain boundary phase-rich layer 12 may include a complex oxide or an oxynitride of at least one of rare earth element and an alkali earth element, and aluminum supplied from aluminum nitride. Therefore, in the case of the grain boundary phases including melting point lowering elements or including multiple rare earth elements or alkali earth elements, the grain boundary phases may include complex oxides or complex oxynitrides thereof, or multiple oxides or nitrides thereof.

For example, the aluminum nitride sintered body 20 may include grain boundary phases including yttrium oxide and aluminum oxide, grain boundary phases including cerium oxide and aluminum oxide, grain boundary phases including samarium oxide and aluminum oxide, grain boundary phases including respective combinatorial complex oxides, grain boundary phases including an oxynitride of a combination respective oxides and aluminum nitride, or the like.

Furthermore, it is preferable that the grain boundary phase components are ternary. This improves wettability of the grain boundary phase components with the aluminum nitride grains. Therefore, the grain boundary phases in the grain boundary phase-rich layer 12 can be formed to cover the aluminum nitride grains, and this can improve corrosion resistance thereof. For example, grain boundary phases including yttrium oxide, aluminum oxide, and magnesium oxide, grain boundary phases including cerium oxide, aluminum oxide, and magnesium oxide, grain boundary phases including samarium oxide, aluminum oxide, and magnesium oxide, grain boundary phases including respective combinatorial complex oxides, grain boundary phases including an oxynitride of a combination respective oxides and aluminum nitride, or the like may be included.

Furthermore, it is preferable that the aluminum nitride sintered body 20 before heat treatment includes the grain boundary phases of about 5 to about 50% by volume. Inclusion of grain boundary phases of about 5% by volume or more can facilitate supply of grain boundary phase components necessary for grain boundary phase-rich layer 12 formation. As a result, the grain boundary phase-rich layer 12 can be properly formed in a shorter period. Furthermore, inclusion of grain boundary phases of about 50% by volume or less can prevent decrease in thermal conductance of the resulting aluminum nitride ceramic 10. In the aluminum nitride sintered body 20 before heat treatment, grain boundary phase content of the surface layer may be nearly equal to that of the inside.

In addition, the aluminum nitride sintered body 20 preferably has a density between about 3.00 and about 5.70 $g/cm^3$. Furthermore, the aluminum nitride sintered body 20 preferably has a porosity between about 0 and about 10%. Moreover, it is preferable that the aluminum nitride sintered body 20 has a mean grain diameter of about 0.5 to about 20 μm. These facilitate formation of the grain boundary phase-rich layer 12.

Such aluminum nitride sintered body 20 may be formed by preparing a raw powder made by blending aluminum nitride powder and compounds necessary for grain boundary phase formation. For example, a compound generating the first component including at least one of rare earth element and alkali earth element, and a compound generating the second component differing in reducing characteristics from the first component may be blended with the aluminum nitride powder. Alternatively, a complex compound generating the first component and the second component may be blended with the aluminum nitride powder.

For example, an oxide including at least one of rare earth element and alkali earth element that generates the first component, and an oxide including at least one of rare earth element and alkali earth element that generates the second component may be blended with the aluminum nitride powder, or a complex oxide thereof may be blended with the aluminum nitride powder. Alternatively, an oxide including at least one of rare earth element and alkali earth element that generates the first component, and at least one of aluminum oxide, magnesium oxide, and calcium oxide that becomes the second component may be blended with the aluminum nitride powder, or a complex oxide thereof may be blended with the aluminum nitride powder. Note that since the aluminum oxide obtained by oxidizing the aluminum nitride grain surfaces may be used, mixing of additional aluminum oxide may be omitted. In other words, the resource for aluminum oxide is not limited. Aside from these points, the aluminum nitride sintered body 20 may be formed in the same manner as the aluminum nitride sintered body used for impregnation described above.

Next, heat treatment is carried out at a temperature (hereafter referred to as 'heat treatment temperature'), which the grain boundary phases can exist in a solid phase before heat treatment and become a liquid phase by reducing at least one of components and changing composition of the grain boundary phases in a reduction atmosphere. When the aluminum nitride sintered body 20 is heat treated at the heat treatment temperature in a reduction atmosphere, preferentially reduces a component with higher reducing characteristics included in the grain boundary phases. At this time, reduction is carried out starting from the surface layer of the aluminum nitride sintered body 20. Therefore, in the surface layer of the aluminum nitride sintered body 20, the composition of the grain boundary phases before heat treatment changes, and the melting point of the grain boundary phases decreases. Accordingly, the grain boundary phases change from solid phase to liquid phase.

As a result, the liquefied grain boundary phase components in the surface layer of the aluminum nitride sintered body 20 begin to permeate into the aluminum nitride sintered body 20. This forms a grain boundary phase-rich layer 12 having much amount of grain boundary phases between the inside and the surface layer of the aluminum nitride sintered body 20. The grain boundary phase-reduced layer 13 in which the grain boundary phase components are reduced is formed in the surface layer of the aluminum nitride sintered body 20. Furthermore, since the grain boundary phase components do not permeate further inside than the grain boundary phase-rich layer 12, the central part of the aluminum nitride sintered body 20 hardly shows any change in amount of grain boundary phases even after heat treatment. Accordingly, as shown in FIG. 2, an aluminum nitride sintered body may be provided comprising an inside 11 including nearly equivalent grain boundary phases as before heat treatment, a grain boundary phase-rich layer 12 including much amount of grain boundary phases, and a grain boundary phase-reduced layer 13 being poor in grain boundary phases.

Figure 3:
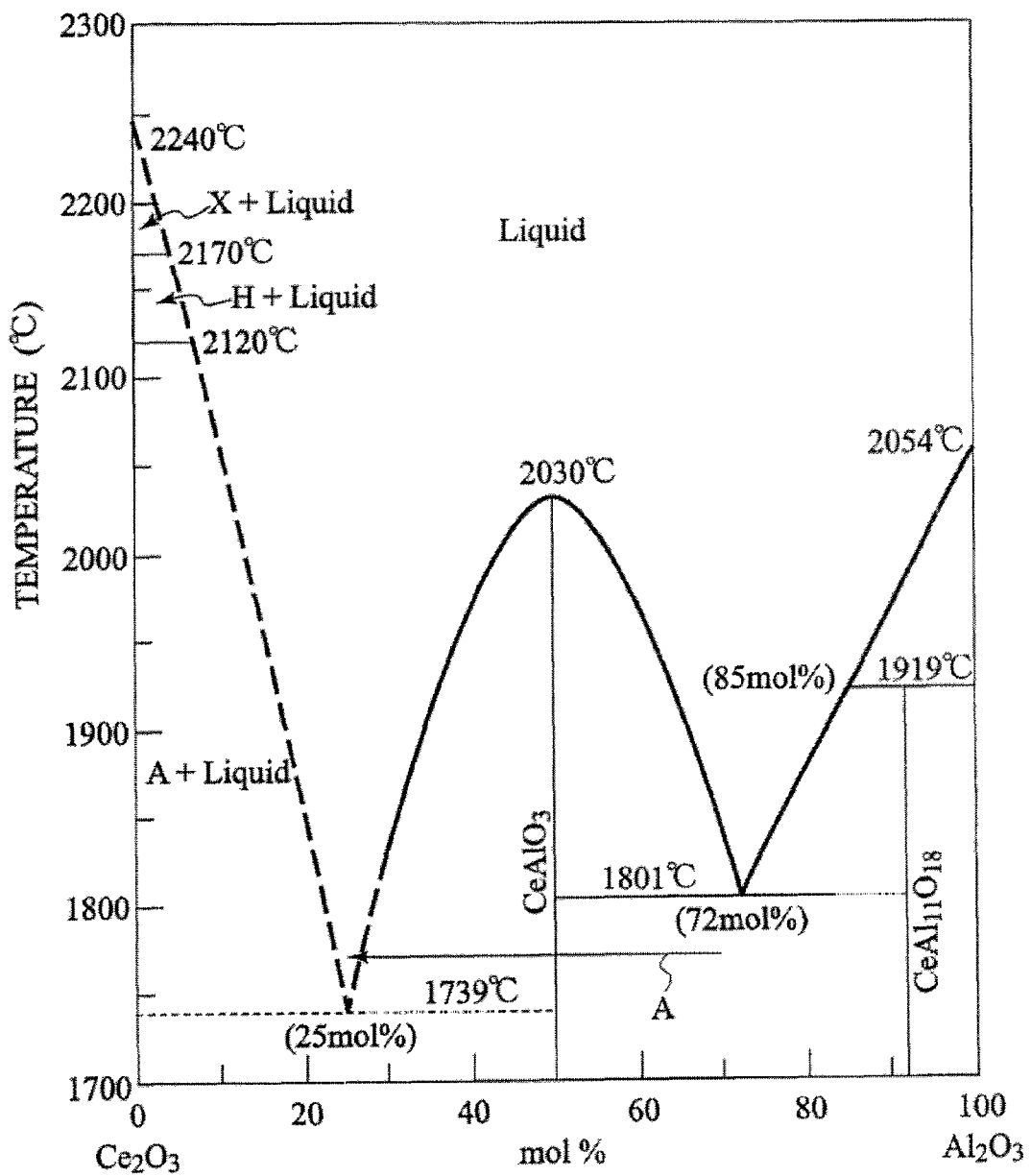
FIG. 3 is a phase diagram of aluminum oxide and cerium oxide.
Figure 5:
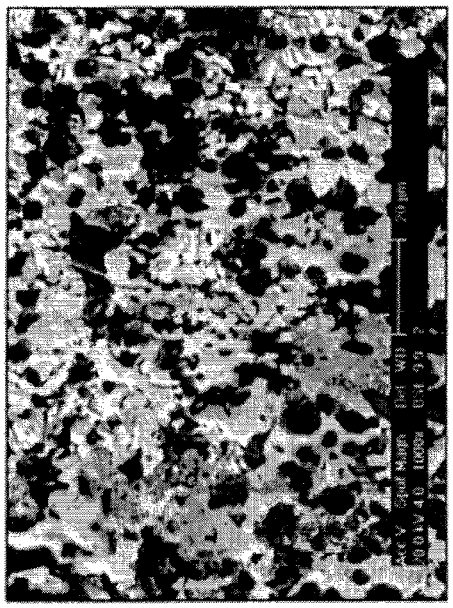
FIG. 5 is a SEM micrograph of the surface of aluminum nitride ceramic of working example 2.

The grain boundary phases include cerium oxide ($Ce_2O_3$) and aluminum oxide ($Al_2O_3$) as two components differing in reducing characteristics is described in detail referencing FIG. 3 as an example For example, when the grain boundary phases before heat treatment include 30 mol % cerium oxide and 70 mol % aluminum oxide, the grain boundary phases may exist in a solid phase in 1770° C. (origin of arrow A). When heat treatment is carried out in a reduction atmosphere maintaining 1770° C. for a long time, aluminum oxide included in the grain boundary phases of the surface layer of the aluminum nitride sintered body 20 with higher reducing characteristics is reduced by priority.

As a result, the composition of the grain boundary phases in the surface layer of the aluminum nitride sintered body 20 changes to 75 mol % cerium oxide and 25 mol % aluminum oxide (end of arrow A). The grain boundary phases become a liquid phase at 1770° C. with this composition. In other words, since the melting point of the composition at the end point of arrow A is lower than that of the composition at the origin of arrow A, the grain boundary phases change from a solid phase to a liquid phase regardless of being held in the same heat treatment temperature.

Since wettability of the liquefied grain boundary phase components in the surface layer of the aluminum nitride sintered body 20 is favorable, they begin to permeate into the inside of the aluminum nitride sintered body 20. This forms the grain boundary phase-rich layer 12 including much amount of grain boundary phases, which include cerium oxide and aluminum oxide, between the inside and the surface layer of the aluminum nitride sintered body 20. The grain boundary phase-reduced layer 13 in which the grain boundary phase components are reduced is then formed in the surface layer of the aluminum nitride sintered body 20. The grain boundary phase-reduced layer 13 has less grain boundary phase content than the inside 11. In addition, since the grain boundary phase-reduced layer 13 has pores formed in portions from which the grain boundary phase components have moved inward, and the density thereof is low.

The heat treatment temperature is not particularly limited as long as it satisfies two conditions: a temperature, which allows the grain boundary phases before heat treatment to be in a solid phase; and the temperature, which allows the grain boundary phases to become a liquid phase due to at least one of components being reduced. Accordingly, the heat treatment temperature may be determined according to the composition of the grain boundary phase components before heat treatment. Furthermore, the heat treatment temperature may be determined with consideration of an effect on characteristics of the inside 11 of the aluminum nitride sintered body 20 and the like.

Furthermore, the reduction atmosphere may be an atmosphere including carbon or the like. For example, using a case accommodating the aluminum nitride sintered body 20, a heater, a refractory lining of a furnace for heat treatment, or the like which includes carbon can provide a reduction atmosphere including carbon. Alternatively, a reduction atmosphere including carbon may be provided by accommodating powder including carbon or bulk including carbon in a furnace for heat treatment as well as in the aluminum nitride sintered body 20, or supplying gas including carbon to the furnace.

Furthermore, heat treatment is preferably carried out for about 1 hour to about 100 hours. In other words, holding at the heat treatment temperature for about 1 hour to about 100 hours is preferred. Carrying out heat treatment for about 1 hour or more allows liquefaction of the grain boundary phases in the surface layer of the aluminum nitride sintered body 20, and sufficient permeation of the liquefied grain boundary phases to the inside of the aluminum nitride sintered body 20. As a result, a grain boundary phase-rich layer 12 can be properly formed. Furthermore, addition of unnecessary heat to the aluminum nitride sintered body 20, are prevented by keeping heat treatment to under about 100 hours. This can prevent adverse affects on aluminum nitride characteristics, deformation and the like.

Forming the aluminum nitride sintered body 20 and heat treatment in the reduction atmosphere may be consecutively carried out. For example, the aluminum nitride sintered body 20 is formed by sintering a compact at a sintering temperature in a reduction atmosphere. Heat treatment may then be carried out by holding the aluminum nitride sintered body 20 as is at the heat treatment temperature for time necessary for heat treatment. Alternatively, after sintering in an atmosphere different from the reduction atmosphere, a gas including carbon may be introduced to change to the reduction atmosphere and then carry out heat treatment. Furthermore, if the sintering temperature and the heat treatment temperature are the same, the temperature does not need to be changed, while if the temperatures differ, the temperature should be raised or lowered.

The thickness of the grain boundary phases in the grain boundary phase-rich layer 12, the grain boundary phase content of the grain boundary phase rich layer 12, the thickness of the grain boundary phase-rich layer 12, and the grain boundary phase content of the inside 11 may be controlled by adjusting the heat treatment temperature, heat treatment time (holding time), and amount of grain boundary phases included in the aluminum nitride sintered body 20.

The grain boundary phase-reduced layer 13 formed in the surface layer of the aluminum nitride sintered body 20 covering the grain boundary phase-rich layer 12 is then removed. The grain boundary phase-reduced layer 13 is removed by grinding, blasting, or the like, for example. In this manner, the aluminum nitride ceramic 10 comprising the grain boundary phase-rich layer 12 with more amount of grain boundary phases in the surface layer than in the inside, in which the grain boundary phases include at least one of rare earth element and alkali earth element. Therefore, corrosion resistance may be improved while maintaining aluminum nitride characteristics thereof.

Note that in the case of forming an electrostatic chuck or RF susceptor including an electrode, a heater including a resistance heating element, an aluminum nitride sintered body including the electrode or resistance heating element may be formed. The electrode or resistance heating element may be made of a refractory conductive material such as molybdenum, tungsten, or the like.

For example, an aluminum nitride sintered body including the electrode or resistance heating element may be formed by burying the electrode or resistance heating element in a compact and sintering. For example, a refractory conductive material bulk or the like may be buried as the electrode or resistance heating element. As the electrode, planar electrode with holes, mesh-shaped electrode (wire mesh electrode), or the like may be buried. As the resistance heating element, the resistance heating element that are coil shaped, spiral shaped, or the like may be buried. Alternatively, a printed electrode or printed resistance heating element may be formed by printing a printing paste including a refractory conductive material. Two green sheets are formed, for example. The printed electrode or printed resistance heating element is formed by printing a printing paste on the surface of one of the green sheet. The other green sheet may then be stacked upon the printed electrode or printed resistance heating element to form a green sheet layered body as a compact.

In these cases, sintering is preferably carried out through hot pressing. More specifically, sintering is carried out while applying pressure in a uniaxial direction. This allows forming an aluminum nitride sintered body having high adhesiveness with the buried electrode or resistance heating element.

Although the inventions have been described above by reference to certain embodiments of the inventions, the inventions are not limited to the embodiments described above. Modifications and variations of the embodiments described above will occur to those skilled in the art, in light of the above teachings.

EXAMPLES

Next, although the present invention is described in further detail through working examples, it is not limited in any way thereto.

Working Examples 1 through 6, Comparative Example (Manufacturing Aluminum Nitride Sintered Body)

First, 95% by weight aluminum nitride powder and 5% by weight yttrium oxide powder are blended, preparing a raw powder. Commercially available aluminum nitride powder and yttrium oxide powder are used. Isopropyl alcohol is added as a solvent to the raw powder, and wet blending is carried out for four hours using a nylon pot and pebbles, preparing slurry. The slurry is dried at 110° C. and granulated, forming a granulated powder. Furthermore, the granulated powder is heated for 5 hours at 450° C. in atmospheric air to burn off nylon components mixed in during wet blending. Next, the granulated powder is formed by applying pressure in a uniaxial direction using a metal mold, forming a plate-shaped compact with a diameter of 50 mm and thickness of 20 mm. Note that the pressure for forming is 200 kgf/cm$^2$.

The resulting compact is placed in a carbon case and subjected to hot press sintering to provide an aluminum nitride sintered body. The pressing pressure is set to 200 kgf/cm$^2$, the sintering temperature is set to 1800° C., the holding time at 1800° C. is for four hours. After this holding, the aluminum nitride sintered body is cooled. The sintering atmospheres are: room temperature to 1000° C. is a vacuum atmosphere; and 1000 to 1800° C. is a pressure-applied nitrogen atmosphere introduced with nitrogen gas under a pressure of 1.5 kgf/cm$^2$. The surface of the provided aluminum nitride sintered body is ground using a number 800 diamond grindstone.

(Impregnation)

Impregnants with respective compositions given in Table 1 are prepared as working examples 1 through 6. Note that aluminum oxide for which mol % is not indicated in Table 1 includes an amount (remaining mol %) found by subtracting the components with values in mol % from 100 mol %. For example, in the case of working example 1, the amount of aluminum oxide is 77 mol %, and in the case of example 2, the amount of aluminum oxide is 31 mol %. In addition, an impregnant of working example 1 includes a mixed phase of aluminum oxide and yttrium aluminum garnet (YAG) with aluminum oxide and yttrium oxide in the compositional ratio given in Table 1. An impregnant of working example 3 is a complex oxide including aluminum oxide and cerium oxide in the compositional ratio given in Table 1. The impregnant includes perovskite (P) phase and beta (β) phase as the complex oxide. An impregnant of working example 5 is a complex oxide including aluminum oxide and samarium oxide in the compositional ratio given in Table 1. The impregnant includes perovskite (P) phase and beta (β) phase as the complex oxide.

20 g of respective impregnants are blended with 18 g ethanol to prepare an impregnant solution (slurry impregnant). The aluminum nitride sintered body is immersed (dipped) in the respective impregnant solutions and then pulling it out of the impregnant solutions, to adhere the impregnants on the aluminum nitride sintered body surface. The impregnants are then dried at 80° C. in atmospheric air.

The melted impregnants are impregnated in the surface layer of the aluminum nitride sintered bodies by heating the aluminum nitride sintered bodies on which the impregnants are adhered at respective impregnation temperatures given in Table 1 and then melting the impregnants. Impregnation is carried out by holding the aluminum nitride sintered bodies at the impregnation temperature for four hours in a 101325 Pa pressured nitrogen atmosphere. The aluminum nitride ceramic of working examples 1 through 6 are manufactured in this manner. Note that an aluminum nitride sintered body not subjected to impregnation is prepared as a comparative example.

Figure 7:
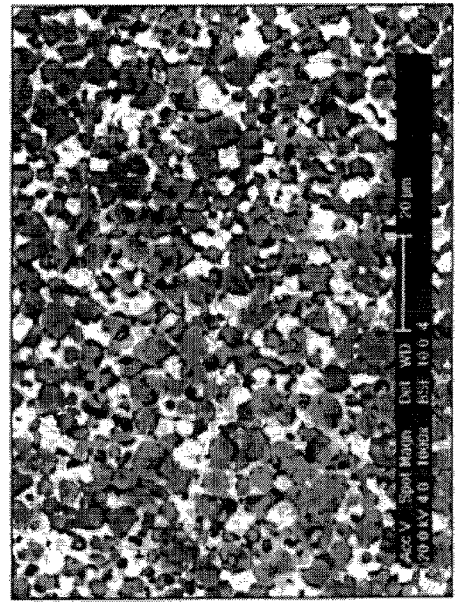
FIG. 7 is a SEM micrograph of the surface of aluminum nitride ceramic of working example 4.
Figure 6:
FIG. 6 is a SEM micrograph of the surface of aluminum nitride ceramic of working example 3.
Figure 8:
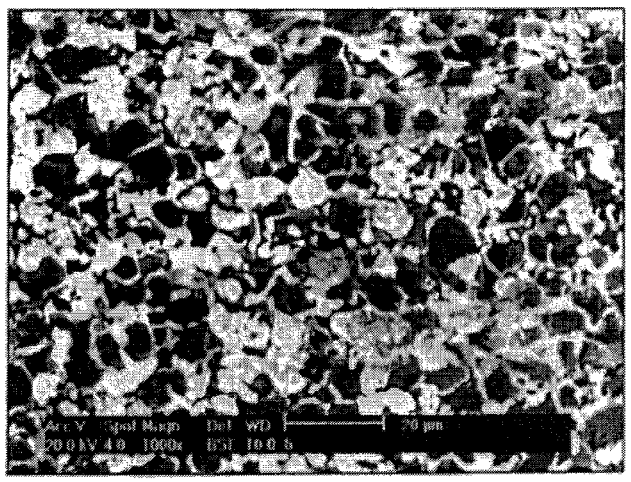
FIG. 8 is a SEM micrograph of the surface of aluminum nitride ceramic of working example 5.
Figure 9:
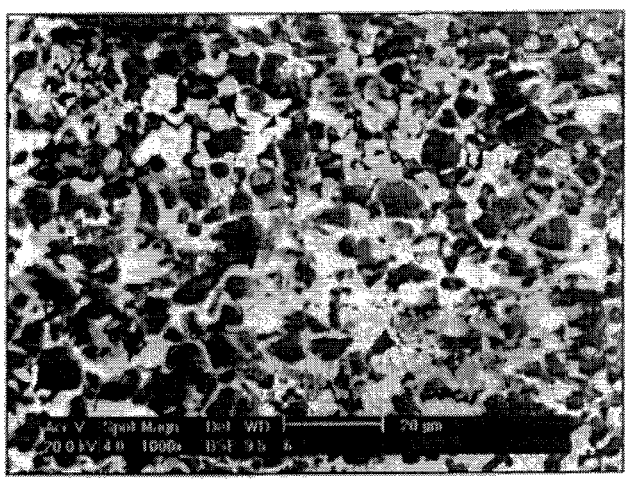
FIG. 9 is a SEM micrograph of the surface of aluminum nitride ceramic of working example 6.
Figure 10:
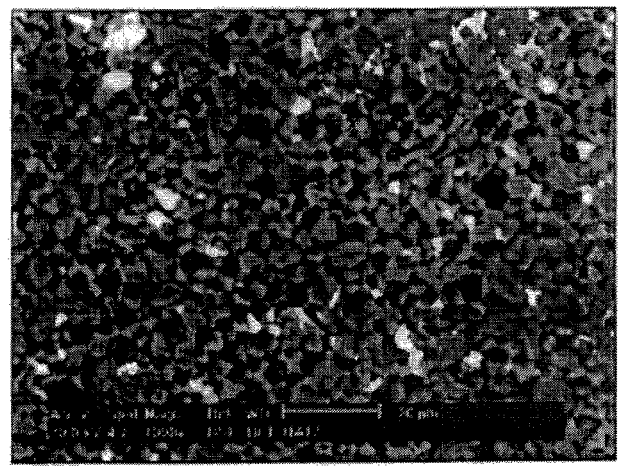
FIG. 10 is a SEM micrograph of the surface of an aluminum nitride sintered body of a comparative example.

FIG. 6 for working example 3, FIG. 7 for working example 4, FIG. 8 for working example 5, FIG. 9 for working example 6, and FIG. 10 for the comparative example(SEM micrograph of the surface). Compositions shown in FIGS. 4 through 9 indicate that the aluminum nitride sintered body is impregnated with respective impregnants given in Table 1. Furthermore, the written temperatures indicate impregnation temperatures.

In FIGS. 4 through 10, black areas indicate aluminum nitride grains, while white areas indicate grain boundary phases. The aluminum nitride ceramic of working examples 1 through 6 have the aluminum nitride grains covered by the grain boundary phases, where an abundance of grain boundary phases exist, as shown in FIGS. 4 through 9. In this manner, the aluminum nitride ceramic of working examples 1 through 6 have a grain boundary phase-rich layer formed in the surface layer near the surface to which the impregnants are in contact. Meanwhile, as shown in FIG. 10, the aluminum nitride sintered body of the comparative example has grain boundary phases scattered at only triple point of the crystal grain boundary of the aluminum nitride grains, poor in grain boundary phases.

(Cross-sectional Observation)

Cross-sectional observation for the working examples 5 and 6 is carried out using a scanning electron microscope (SEM) at a magnification of 1000 times. The aluminum nitride ceramic of working examples 5 and 6 are cut perpendicular to the surface to which the impregnants are in contact, the cut surfaces are polished, and the cross section is then observed from the surface layer to inside of the aluminum nitride ceramic.

A cross-sectional micrograph of the surface layer of the aluminum nitride ceramic of working example 5 is shown in FIG. 11A, and a cross-sectional micrograph of the inside is shown in FIG. 11B. A cross-sectional micrograph of the surface layer of the aluminum nitride ceramic of working example 6 is shown in FIG. 12A, and cross-sectional micrographs of the inside is shown in FIGS. 12B and 12C. FIG. 12B shows a portion closer to the surface layer, and FIG. 12C shows a portion closer to the center. Compositions shown in FIGS. 11B and 12C indicate that the aluminum nitride sintered body is impregnated with respective impregnants given in Table 1. Furthermore, the written temperatures indicate impregnation temperatures.

In FIGS. 11A, 11B, and 12A through 12C, black areas indicate aluminum nitride grains, while white areas indicate

TABLE 1

| | IMPREGNANT | IMPREGNATION TEMPERATURE (° C.) | CORROSION WASTAGE AMOUNT (μm) |
|---|---|---|---|
| WORKING EXAMPLE 1 | Al$_2$O$_3$-23 mol % Y$_2$O$_3$(Al$_2$O$_3$ + YAG) | 1825 | 3 |
| WORKING EXAMPLE 2 | Al$_2$O$_3$-31 mol % Y$_2$O$_3$-38 mol % MgO | 1800 | 2.2 |
| WORKING EXAMPLE 3 | Al$_2$O$_3$-40 mol % CeO$_2$(P + β) | 1825 | 3 |
| WORKING EXAMPLE 4 | Al$_2$O$_3$-38 mol % CeO$_2$-5 mol % MgO | 1800 | 1.75 |
| WORKING EXAMPLE 5 | Al$_2$O$_3$-26 mol % Sm$_2$O$_3$(P + β) | 1825 | 3.2 |
| WORKING EXAMPLE 6 | Al$_2$O$_3$-25 mol % Sm$_2$O$_3$-5 mol % MgO | 1800 | 1.25 |
| COMPARATIVE EXAMPLE | — | — | 4.2 |

(Surface Observation)

Figure 4:
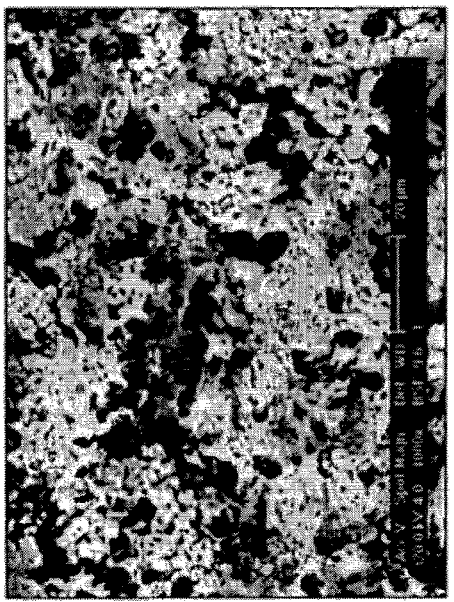
FIG. 4 is a SEM micrograph of the surface of aluminum nitride ceramic of working example 1.

Surface observation for working examples 1 through 6 and the comparative example is carried out using a scanning electron microscope (SEM) at a magnification of 1000 times. The surfaces making contact with the impregnants are observed for working examples 1 through 6. FIG. 4 shows observation results for working example 1, FIG. 5 for working example 2, grain boundary phases. As shown in FIG. 11B, grain boundary phases are little and aluminum nitride grains covered by the grain boundary phases are also few in the inside 11 of the aluminum nitride ceramic. On the contrary, as shown in FIG. 11A, almost all of the aluminum nitride grains in the surface layer of the aluminum nitride ceramic are covered by the grain boundary phases, and the grain boundary phases are more abundant than in the inside 11. As such, a grain boundary phase-rich layer 12 including much amount of grain boundary phases that include aluminum oxide and samarium oxide through impregnation is formed in the surface layer of the aluminum nitride ceramic.

As shown in FIG. 12C, grain boundary phases are little and aluminum nitride grains covered by the grain boundary phases are also few in the inside 11 of the aluminum nitride ceramic. On the contrary, as shown in FIG. 12A, almost all of the aluminum nitride grains in the surface layer of the aluminum nitride ceramic are covered by the grain boundary phases, and the grain boundary phases are more abundant than in the inside 11. As such, a grain boundary phase-rich layer 12 including much amount of grain boundary phases that include aluminum oxide, samarium oxide, and magnesium oxide through impregnation is formed in the surface layer of the aluminum nitride ceramic.

Furthermore, as shown in FIGS. 12B and 12C, there are more amount of grain boundary phases in the area of the inside 11 that is closer to the grain boundary phase-rich layer 12 (FIG. 12B) than in the area closer to the center (FIG. 12C), and there are drastically less amount of grain boundary phases in the area closer to the center (FIG. 12C). In this manner, aluminum nitride ceramic may be provided with grain boundary phases decreasing at a slant (e.g., a decreasing concentration gradient) toward the inside from the surface layer. In other words, aluminum nitride ceramic where the grain boundary phase content is greatest in the surface layer and continuously decreases toward the inside may be provided.

(Corrosion Resistance Test)

First, the aluminum nitride ceramic of working examples 1 through 6 and the aluminum nitride sintered body of the comparative example are polished. More specifically, they are polished for 20 minutes at a pressure of 180 g/cm$^2$ using a buff applied with 9 μm diamonds. They are then polished for 20 minutes at a pressure of 180 g/cm$^2$ using a buff applied with 3 μm diamonds.

After polishing, a part of the polished surface is masked, exposed to a corrosive environment, and tested of corrosion resistance. More specifically, nitrogen fluoride ($NF_3$) is supplied at a flow rate of 75 standard cm$^3$/min (sccm) as a corrosive gas, and plasma is generated by applying a radio frequency (RF) voltage of 800 W. In this a high-temperature corrosive environment of 600° C., the aluminum nitride ceramic of working examples 1 through 6 and the aluminum nitride sintered body of the comparative example are kept for five hours. Note that a bias is not applied.

After the corrosion resistance test, the difference in height between the masked area and area exposed to the corrosive environment is measured as a corrosion wastage amount due to corrosion using a surface roughness meter. Results ate given in Table 1.

As given in Table 1, the aluminum nitride ceramic of working examples 1 through 6 have less corrosion wastage amount than in the comparative example and have high corrosion resistance. Furthermore, working examples 2, 4, and 6, which are impregnated with ternary impregnant, have further less corrosion wastage amount and have higher corrosion resistance.

Working Examples 7 through 15

An aluminum nitride sintered body is formed in the same manner as in working examples 1 through 6. Impregnants with respective compositions given in Table 7 are prepared as working examples 7 through 15. Note that the amount of cerium oxide for which mol % is not indicated in working examples 7 through 12 in Table 2 is 75 mol %, and the amount of aluminum oxide for working examples 13 through 15 is 70 mol %. Furthermore, impregnation is carried out for a holding time given in Table 2 at an impregnation temperature given in Table 2 to form aluminum nitride ceramic of working examples 7 through 15. Aside from the above, impregnation is carried out in the same manner as with working examples 1 through 6.

TABLE 2

| | IMPREGNANT | IMPREGNATION TEMPERATURE (° C.) | HOLDING TIME (hr) |
|---|---|---|---|
| WORKING EXAMPLE 7 | $Ce_2O_3$-25 mol % $Al_2O_3$ | 1800 | 0.5 |
| WORKING EXAMPLE 8 | $Ce_2O_3$-25 mol % $Al_2O_3$ | 1780 | 0.5 |
| WORKING EXAMPLE 9 | $Ce_2O_3$-25 mol % $Al_2O_3$ | 1750 | 0.5 |
| WORKING EXAMPLE 10 | $Ce_2O_3$-25 mol % $Al_2O_3$ | 1720 | 0.5 |
| WORKING EXAMPLE 11 | $Ce_2O_3$-25 mol % $Al_2O_3$ | 1720 | 2 |
| WORKING EXAMPLE 12 | $Ce_2O_3$-25 mol % $Al_2O_3$ | 1700 | 0.5 |
| WORKING EXAMPLE 13 | $Al_2O_3$-25 mol % $Sm_2O_3$-5 mol % MgO | 1800 | 0.5 |
| WORKING EXAMPLE 14 | $Al_2O_3$-25 mol % $Sm_2O_3$-5 mol % MgO | 1780 | 0.5 |
| WORKING EXAMPLE 15 | $Al_2O_3$-25 mol % $Sm_2O_3$-5 mol % MgO | 1750 | 0.5 |

Even under impregnation conditions of any of working examples 7 through 15, the impregnant may impregnate the aluminum nitride sintered body surface layer, and a grain boundary phase-rich layer may be formed. Accordingly, it is understood that even when the impregnation temperature is low as 1700 to 1800° C., and the holding time is short as under two hours, appropriate impregnation and forming the grain boundary phase-rich layer is possible.

In addition, cross-sectional observation is carried out for working examples 7, 10, and 13 using a scanning electron microscope. The aluminum nitride ceramic of working examples 7, 10 and 13 are cut perpendicular to the surface to which the impregnants are in contact, the cut surfaces are polished, and the cross sections are then observed from the surface layer to the inside of the aluminum nitride ceramic. Observation results are given in FIGS. 13A through 15D. In FIGS. 13A through 15D, black areas indicate aluminum nitride grains, while white areas indicate grain boundary phases.

Figure 13B:
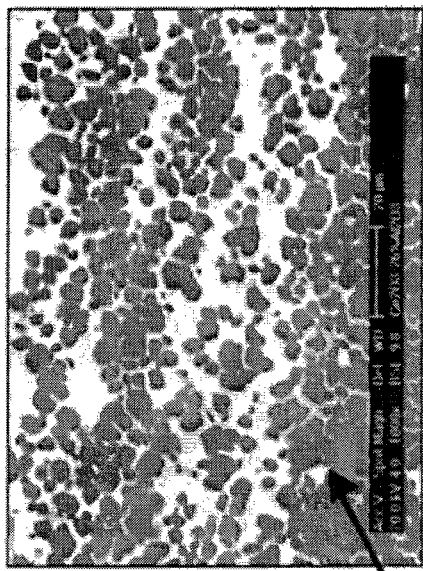
FIGS. 13A through 13C are SEM micrographs of cross sections of aluminum nitride ceramic of working example 7.
Figure 13C:
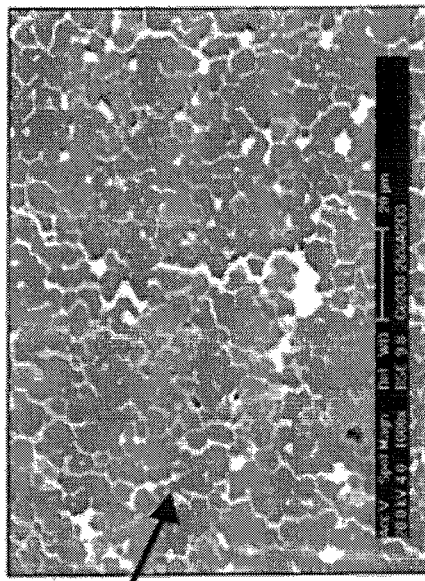
Figure 13A:
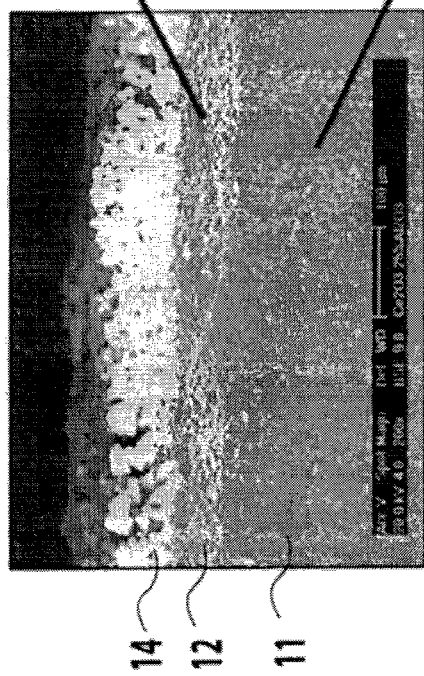

Cross-sectional micrographs for working example 7 are shown in FIGS. 13A through 13C. The magnification of FIG. 13A is 200 times. FIG. 13A shows a state before a remnant impregnant 14 is removed after impregnation. The grain boundary phase-rich layer 12 is formed in the surface layer near the surface to which the impregnant 14 is in contact. FIG. 13B shows a magnified micrograph (1000× magnification) of the grain boundary phase-rich layer 12, and FIG. 13C shows a magnified micrograph (1000× magnification) of the inside 11. As shown in FIG. 13B, the grain boundary phase-rich layer 12 in the surface layer has many aluminum nitride grains covered by grain boundary phases, and more amount of grain boundary phases than in the inside 11 shown in FIG. 13C. In this manner, appropriate impregnation is possible even in a short holding time, and the grain boundary phase-rich layer 12 may be formed.

Figure 14D:
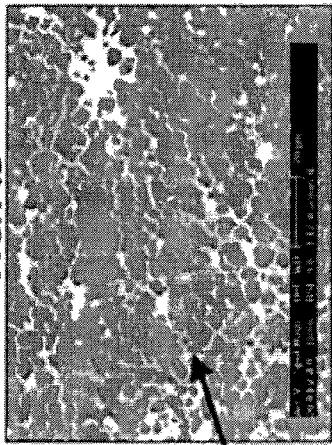
FIGS. 14A through 14F are SEM micrographs of cross sections of aluminum nitride ceramic of working example 10.
Figure 14E:
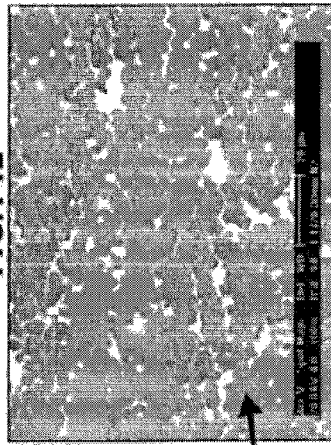
Figure 14F:
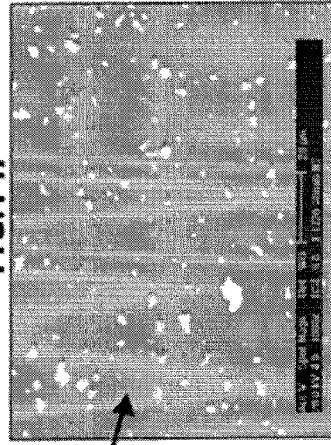
Figure 14B:
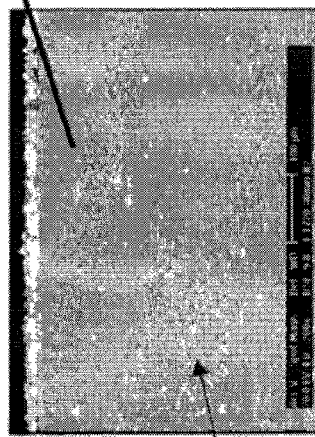
Figure 14C:
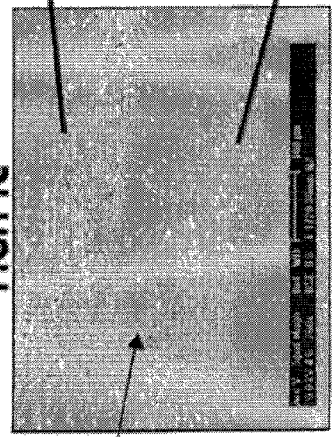
Figure 14A:
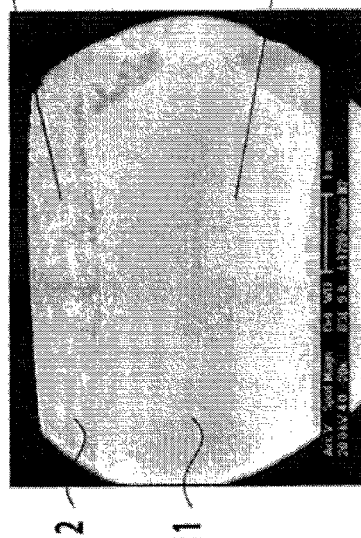

Cross-sectional micrographs for working example 10 are shown in FIGS. 14A through 14F. The magnification of FIG. 14A is 20 times. The grain boundary phase-rich layer 12 is formed in the surface layer near the surface to which the impregnant is in contact. FIG. 14B shows a magnified micrograph (200× magnification) of the grain boundary phase-rich layer 12, and FIG. 14C shows a magnified micrograph (200× magnification) of the inside 11. FIG. 14D shows a further magnified micrograph (1000× magnification) of the grain boundary phase-rich layer 12, and FIGS. 14E and 14F show further magnified micrographs (1000× magnification) of the inside 11. FIG. 14E shows a portion closer to the surface layer, and FIG. 14C shows a portion closer to the center.

As shown in FIGS. 14B and 14D, the grain boundary phase-rich layer 12 in the surface layer has many aluminum nitride grains covered by grain boundary phases, and more amount of grain boundary phases than in respective insides 11 shown in FIGS. 14C, 14E and 14F. In this manner, appropriate impregnation and forming the grain boundary phase-rich layer 12 are possible even in a short holding time. Note that white areas in the surface of FIG. 14B indicate a remnant impregnant.

Furthermore, as shown in FIGS. 14E and 14F, there are more amount of grain boundary phases in the area of the inside 11 that is closer to the grain boundary phase-rich layer 12 (FIG. 14E) than in the area closer to the center (FIG. 14F), and there are drastically less amount of grain boundary phases in the area closer to the center (FIG. 14F). In other words, the grain boundary phases decrease at a slant toward the inside from the surface layer. In this manner, appropriate impregnation and forming the grain boundary phase-rich layer 12 are possible even at a low impregnation temperature and in a short holding time. In addition, aluminum nitride ceramic is provided with the grain boundary phase content continuously decreasing at a slant toward the inside from the surface layer.

Figure 15B:
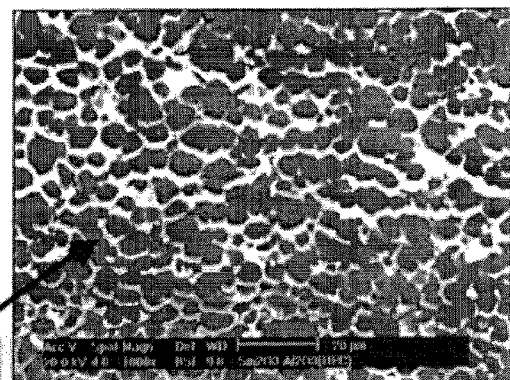
FIGS. 15A through 15D are SEM micrographs of cross sections of aluminum nitride ceramic of working example 13.
Figure 15A:
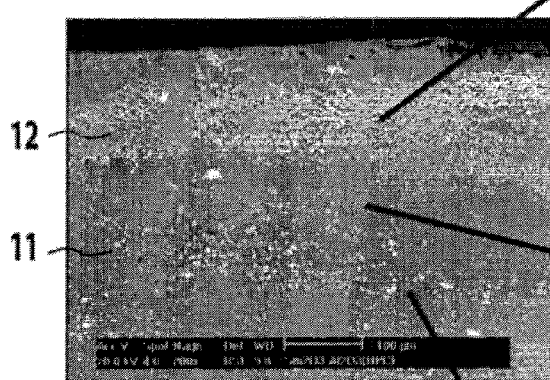
Figure 15C:
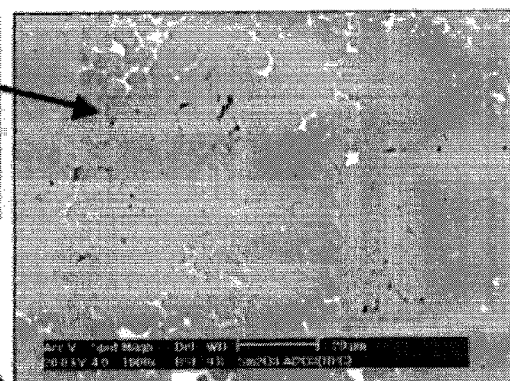
Figure 15D:
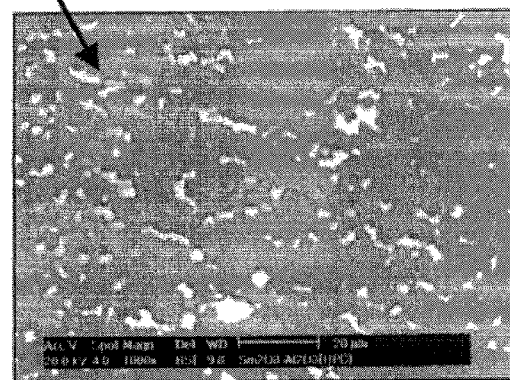

Cross-sectional micrographs for working example 13 are shown in FIGS. 15A through 15D. The magnification of FIG. 15A is 200 times. The grain boundary phase-rich layer 12 is formed in the surface layer near the surface to which the impregnant is in contact. FIG. 15B shows a magnified micrograph (1000× magnification) of the grain boundary phase-rich layer 12, and FIGS. 15C and 15D show magnified micrographs (1000× magnification) of the inside 11. FIG. 15C shows a portion closer to the surface layer, and FIG. 15D shows a portion closer to the center.

As shown in FIG. 15B, the grain boundary phase-rich layer 12 in the surface layer has many aluminum nitride grains covered by grain boundary phases, and more amount of grain boundary phases than in the inside 11 shown in FIGS. 15C and 15D. In this manner, appropriate impregnation and forming the grain boundary phase-rich layer 12 are possible in a short holding time even when using impregnants differing in composition.

Working Example 16

First, 71% by weight aluminum nitride powder, 13% by weight aluminum oxide powder, and 16% by weight cerium oxide ($CeO_2$) powder are blended into a raw powder. Commercially available aluminum nitride powder, aluminum oxide powder and cerium oxide powder are used. Isopropyl alcohol is added as a solvent to the raw powder, and wet blending is carried out for four hours using a nylon pot and pebbles, preparing slurry. The slurry is dried at 110° C. and granulated, forming a granulated powder.

Furthermore, the granulated powder is heated for 5 hours at 450° C. in atmospheric air to burn off nylon components mixed in during wet blending. Next, the granulated powder is formed by applying pressure in a uniaxial direction using a metal mold, forming a plate-shaped compact with a diameter of 50 mm and thickness of 20 mm. Note that the pressure for forming is 200 kgf/cm$^2$.

The resulting compact is placed in a carbon case and kept in a nitrogen atmosphere furnace using a carbon heater. Inside the furnace becomes a reduction atmosphere due to carbon, which is supplied from a carbon case and a carbon heater. In this reduction atmosphere furnace, atmospheric sintering is carried out at a sintering temperature of 1770° C. for one hour, providing an aluminum nitride sintered body. In the same reduction atmosphere furnace as is, the aluminum nitride sintered body is held at 1770° C. for another nine hours to carry out heat treatment in order to form a grain boundary phase-rich layer.

In other words, sintering and heat treatment are consecutively carried out at 1770° C. for ten hours, and then it is cooled. The compact is sintered and sufficiently densified in the first hour. Heat treatment is then carried out for the next nine hours. In other words, the ten hour holding time includes a sintering step to densify, and a heat treatment step to form a grain boundary phase-rich layer. 1770° C. is a heat treatment temperature at which grain boundary phases before heat treatment including aluminum oxide and cerium oxide can exist in a solid phase, and grain boundary phases change into a liquid phase since aluminum oxide with higher reducing characteristics is reduced. Therefore, the compact is held without changing the temperature. Note that the grain boundary phases of the aluminum nitride sintered body provided according to the raw powder composition ratio and sintering conditions includes cerium oxide and aluminum oxide as a complex oxide. The grain boundary phases include perovskite (P) phase and beta (β) phase as the complex oxide. Furthermore, the aluminum nitride sintered body has a grain boundary phase content of 20% by weight.

A cross-section of the aluminum nitride sintered body after heat treatment is observed using a scanning electron microscope. The aluminum nitride sintered body is cut perpendicular to the surface, the cut surface is polished, and the cross-section is then observed toward the inside from the surface layer. Observation results are given in FIGS. 16A through 16F. In FIGS. 16A through 16F, black areas indicate aluminum nitride grains, while white areas indicate grain boundary phases.

Figure 16D:
FIGS. 16A through 16F are SEM micrographs of cross sections of an aluminum nitride sintered body after heat treatment of working example 16.
Figure 16E:
Figure 16F:
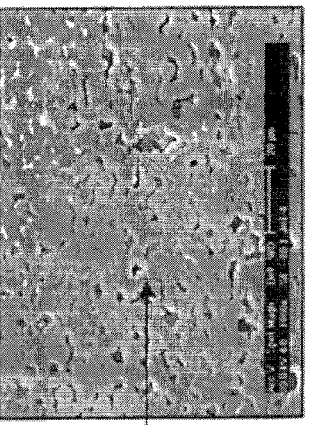
Figure 16B:
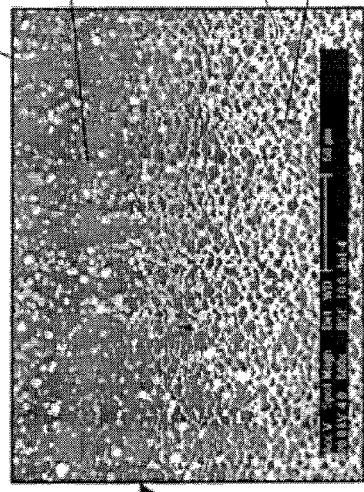
Figure 16C:
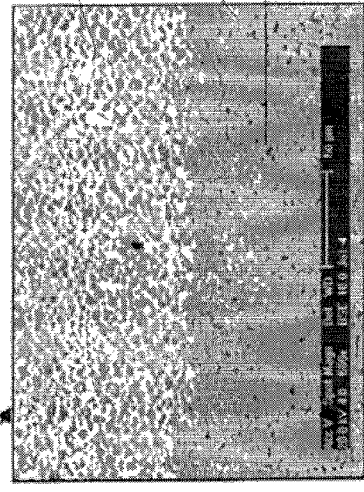
Figure 16A:
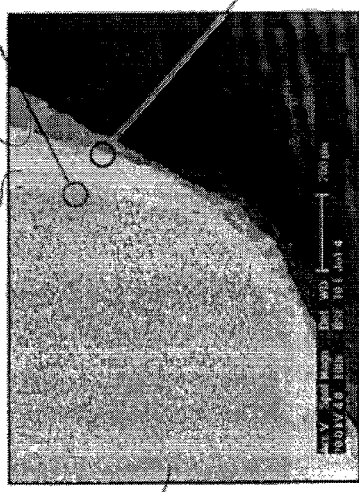

The magnification of FIG. 16A is 100×. The grain boundary phase-rich layer 12 is then formed in the surface layer of the aluminum nitride sintered body through heat treatment. Furthermore, the grain boundary phase-rich layer 12 including abundant grain boundary phases, which include cerium oxide and aluminum oxide, are formed between the grain boundary phase-reduced layer 13 in the surface layer and the inside 11. This grain boundary phase-reduced layer 13 is removed by grinding. As a result, aluminum nitride ceramic that comprises the grain boundary phase-rich layer 12 in the surface layer can be provided.

FIG. 16B shows a magnified micrograph (500× magnification) of the vicinity of the boundary between the inside 11 and the grain boundary phase-rich layer 12. FIG. 16C shows a magnified micrograph (500× magnification) of the vicinity of the boundary between the grain boundary phase-rich layer 12 and the grain boundary phase-reduced layer 13. Furthermore, FIG. 16D shows a magnified micrograph (3000× magnification) of the inside 11, FIG. 16E shows a magnified micrograph (3000× magnification) of the grain boundary phase-rich layer 12, and FIG. 16F shows a magnified micrograph (1000× magnification) of the grain boundary phase-reduced layer 13.

As shown in FIGS. 16B, 16C and 16E, the grain boundary phase-rich layer 12 in the surface layer has many aluminum nitride grains covered by grain boundary phases, and more amount of grain boundary phases than in the inside 11 shown in FIGS. 16B and 16D. Furthermore, as shown in FIGS. 16C and 16F, the grain boundary phase-reduced layer 13 has less amount of grain boundary phases than in the inside 11 shown in FIG. 16D, and pores formed in portions from which the grain boundary phase components have moved away.

Working Example 17

A compact is formed in the same manner as in working example 16. In the same furnace as with working example 16, atmospheric sintering is carried out at a sintering temperature of 1750° C. for one hour, providing an aluminum nitride sintered body. In the same reduction atmosphere furnace as is, the aluminum nitride sintered body is held at 1750° C. for another fourteen hours to carry out heat treatment in order to form a grain boundary phase-rich layer. In other words, sintering and heat treatment are consecutively carried out at 1750° C. for fifteen hours, and then cooled. 1750° C. is a heat treatment temperature at which grain boundary phases before heat treatment including aluminum oxide and cerium oxide can exist in a solid phase, and grain boundary phases change into a liquid phase since aluminum oxide with higher reducing characteristics is reduced. Therefore, the compact is held without changing the temperature.

Note that the grain boundary phases of the aluminum nitride sintered body provided according to the raw powder composition ratio and sintering conditions includes cerium oxide and aluminum oxide as a complex oxide. The grain boundary phases include perovskite (P) phase and beta (β) phase as the complex oxide. Furthermore, the aluminum nitride sintered body has a grain boundary phase content of 20% by weight.

Figure 17:
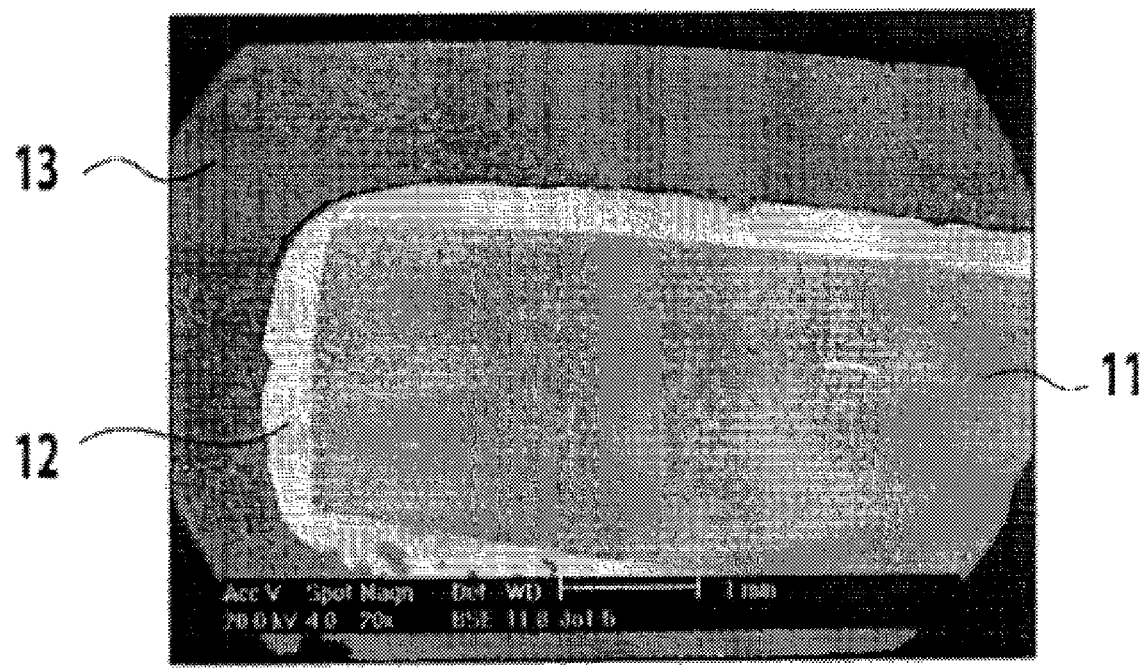
FIG. 17 is a SEM micrograph of a cross section of an aluminum nitride sintered body after heat treatment of working example 17.

A cross section of the post-heat treatment aluminum nitride sintered body is observed using a scanning electron microscope. The aluminum nitride sintered body is cut perpendicular to the surface, the cross-section is then observed toward inside from the surface layer. Observation results are given in FIG. 17. The magnification of FIG. 17 is 20 times. The grain boundary phase-reduced layer 13 is then formed through heat treatment having less amount of grain boundary phases in the surface layer of the aluminum nitride sintered body than in the inside 11, and many pores. Furthermore, the grain boundary phase-rich layer 12 including abundant grain boundary phases, which include cerium oxide and aluminum oxide, are formed between the grain boundary phase-reduced layer 13 in the surface layer and the inside 11. This grain boundary phase-reduced layer 13 is removed by grinding. As a result, aluminum nitride ceramic can be provided. More specifically, approximately 1 mm of the aluminum nitride sintered body is removed from the outside by grinding.

A cross section of the provided aluminum nitride ceramic is observed using a scanning electron microscope. Observation results are given in FIGS. 18A through 18D. The magnification of FIG. 18A is 200 times. FIGS. 18B through 18D are magnified micrographs (400× magnification) of FIG. 18A, showing cross sections cut at different positions in the vicinity of the surface layer of the aluminum nitride ceramic shown in FIG. 18A. As shown in FIGS. 18A through 18D, the grain boundary phase-rich layer 12 is formed having more abundant grain boundary phases existing in the surface layer of the aluminum nitride ceramic than in the inside 11, and the aluminum nitride grains covered by the grain boundary phases. Furthermore, as shown in FIGS. 18B through 18D, the grain boundary phase-rich layer 12 is formed uniformly in the surface layer of the aluminum nitride ceramic.

What is claimed is:

1. An aluminum nitride ceramic including aluminum nitride grains and grain boundary phases, the aluminum nitride ceramic comprising:
   a grain boundary phase-rich layer having a higher grain boundary phase content in a surface layer of the aluminum nitride ceramic than a grain boundary phase content in an inside of the aluminum nitride ceramic, wherein the grain boundary phase content in the grain boundary phase-rich layer is in a range of about 10 to about 70 % by volume;
   wherein substantially all aluminum nitride grains in the grain boundary phase-rich layer are covered by the grain boundary phases in the surface layer thereof;
   wherein grain boundary phases in the grain boundary phase-rich layer include at least one of a rare earth element and an alkali earth element; and
   wherein the aluminum nitride ceramic exhibits an amount of corrosion wastage of 3.2 μm or less.

2. The aluminum nitride ceramic of claim 1, wherein a thickness of the grain boundary phase-rich layer is in a range of about 1 to about 200 μm.

3. The aluminum nitride ceramic of claim 1, wherein the grain boundary phase content decreases in a gradient from the surface layer toward the inside of the aluminum nitride ceramic.

4. The aluminum nitride ceramic of claim 1, wherein the grain boundary phases in the grain boundary phase-rich layer include at least one of yttrium, cerium, samarium, europium, lanthanum, praseodymium, neodymium, promethium, gadolinium, terbium, and dysprosium.

5. The aluminum nitride ceramic of claim 1, wherein the grain boundary phases in the grain boundary phase-rich layer include at least one of aluminum, magnesium, calcium, strontium, and barium.

6. A semiconductor manufacturing member at least partly comprising an aluminum nitride ceramic including aluminum nitride grains and grain boundary phases, the aluminum nitride ceramic comprising a grain boundary phase-rich layer having a higher grain boundary phase content in a surface layer of the aluminum nitride ceramic than a grain boundary phase content in an inside of the aluminum nitride ceramic, wherein the grain boundary phase content in the grain boundary phase-rich layer is in a range of about 10 to about 70% by volume;

wherein substantially all aluminum nitride grains in the grain boundary phase-rich layer are covered by the grain boundary phases in the surface layer thereof;

wherein grain boundary phases in the grain boundary phase-rich layer include at least one of a rare earth element and an alkali earth element; and wherein the aluminum nitride ceramic exhibits an amount of corrosion wastage of 3.2 μm or less.

7. The aluminum nitride ceramic of claim 1, wherein the grain boundary phase content in the grain boundary phase-rich layer is in a range of at least 10% by volume to about 70% by volume.

8. The semiconductor manufacturing member of claim 6 wherein the grain boundary phase content in the grain boundary phase-rich layer is in a range of at least 10% by volume to about 70% by volume.

* * * * *